(12) United States Patent
Dunn et al.

(10) Patent No.: US 11,753,844 B2
(45) Date of Patent: Sep. 12, 2023

(54) ROOFTOP TENT ASSEMBLY FOR VEHICLES

(71) Applicants: Timothy Dunn, Christchurch (NZ); William Rykers, Christchurch (NZ)

(72) Inventors: Timothy Dunn, Christchurch (NZ); William Rykers, Christchurch (NZ)

(*) Notice: Subject to any disclaimer, the term of this patent is extended or adjusted under 35 U.S.C. 154(b) by 42 days.

(21) Appl. No.: 17/342,568

(22) Filed: Jun. 9, 2021

(65) Prior Publication Data

US 2022/0396967 A1    Dec. 15, 2022

(51) Int. Cl.
| | |
|---|---|
| *E04H 15/06* | (2006.01) |
| *B60P 3/39* | (2006.01) |
| *E04H 15/32* | (2006.01) |
| *B60R 9/055* | (2006.01) |
| *E04H 15/54* | (2006.01) |

(52) U.S. Cl.
CPC ........... *E04H 15/06* (2013.01); *B60P 3/39* (2013.01); *E04H 15/324* (2013.01); *B60R 9/055* (2013.01); *E04H 15/54* (2013.01)

(58) Field of Classification Search
CPC ......... E04H 15/06; E04H 15/324; B60P 3/38; B60P 3/39
See application file for complete search history.

(56) References Cited

U.S. PATENT DOCUMENTS

| | | | | |
|---|---|---|---|---|
| 3,499,175 | A * | 3/1970 | Orberg ................. | A47C 17/82 5/119 |
| 3,924,365 | A * | 12/1975 | Orberg ................. | B60P 3/38 52/63 |
| 4,058,133 | A * | 11/1977 | Barr ................. | B60P 3/38 135/132 |
| 9,222,278 | B2 * | 12/2015 | Park ................. | E04H 15/06 |
| 10,077,574 | B1 * | 9/2018 | Currid ................. | B60R 9/045 |
| 10,543,771 | B2 * | 1/2020 | Sautter ................. | B60P 3/34 |
| 10,808,416 | B2 * | 10/2020 | Park ................. | E04H 15/06 |
| 11,193,298 | B2 * | 12/2021 | Park ................. | E04H 15/644 |
| 11,346,123 | B2 * | 5/2022 | Park ................. | E04H 15/48 |
| 2019/0376309 | A1 * | 12/2019 | Montesalvo ......... | E04H 15/324 |
| 2021/0270055 | A1 * | 9/2021 | Park ................. | B60P 3/39 |
| 2022/0251868 | A1 * | 8/2022 | Park ................. | E04H 15/48 |

FOREIGN PATENT DOCUMENTS

| | | | | | |
|---|---|---|---|---|---|
| CN | 108468466 | A | * | 8/2018 | ............ E04H 15/06 |
| CN | 111734206 | A | * | 10/2020 | |
| KR | 20150092023 | A | * | 8/2015 | |
| KR | 20200114571 | A | * | 10/2020 | |
| WO | WO-2019227265 | A1 | * | 12/2019 | |

* cited by examiner

*Primary Examiner* — David R Dunn
*Assistant Examiner* — Danielle Jackson

(57) ABSTRACT

A rooftop tent assembly for vehicles is disclosed. The rooftop tent assembly comprises a base affixed to a roof portion of the vehicle. The base is hingedly connected with an extension plate on one end for providing sheltered living space and is affixed with a cover to conceal the rooftop tent assembly to another end of the base plate. The cover is formed by welding a tread plate to a top portion of the shell frame. The tent assembly is positioned over the base of the vehicle by pulling the ladder affixed to the extension plate down and adjusting the extension plate until it gets parallel with the base, after opening the cover. An internal seal system is provided with a gasket affixed to internal flange on the bottom portion of the cover to prevent water, dust, and other particulates from entering into the rooftop tent assembly when closed.

17 Claims, 18 Drawing Sheets

ROOFTOP TENT ASSEMBLY FOR VEHICLES

BACKGROUND OF THE INVENTION

A. Technical Field

The present invention generally relates to a rooftop tent assembly. More specifically, the present invention relates to a rooftop tent assembly for vehicles, configured to be easily affixed on the top of a vehicle and be easily deployed by unfolding and expanding when a ladder is pulled by a user. The rooftop tent assembly could be a lightweight, portable, aerodynamic platform, which is converted to sheltered living space for the users.

B. Description of Related Art

Vehicle-mounted rooftop tents gained popularity and elevate camping experience for users. They allow users to easily convert any vehicle such as, but not limited to, a car, SUV, crossover, a wagon, a pickup truck, a van, a trailer into a mobile basecamp that is always ready for adventure. The rooftop tents provide outdoor accommodation facilities for the users.

Usually in travel destinations, accommodation facilities such as resorts and hotels are used. It is also difficult to get accommodation during the crowded season and the cost is relatively high, which is a big burden for the users. In addition, the demand for auto camping has exploded and established itself as a culture due to the demand to enjoy weekends and leisure at a relatively low cost in a place a little closer to nature.

Few existing patent references attempted to address problems cited in the background as prior art over the presently disclosed subject matter and are explained as follows:

A prior art U.S. Ser. No. 10/947,753 assigned to Currid Evan Michael, discloses about a hard-shell rooftop tent with utility rails. The tent system may include a low profile, rack ready, and versatile hard shell. The hard shell may be constructed of other lightweight but strong materials, such as certain types of plastics, carbon fiber, aluminum, steel, etc. The rigid surfaces may be solid or include some other construction, such as a flat top and an interior constructed using honeycombs etc., A rigid surface may be constructed of steel, aluminum, fiberglass, wood, carbon fiber. The tent sides may be constructed of a lightweight or breathable material. Tent sides may be constructed of a heavier material than the top portion, such as canvas, providing privacy, durability. The support may be attached to the base member using bolts, rivets, and adhesive. The fit of the attachment member and the attachment member receptacle may be tight enough to form a watertight seal.

Another prior art US20190352924 assigned to Currid Evan, discloses about a tent system comprising a first shell member configured to mount to a roof of a vehicle, the first shell member comprising a honeycomb assembly. Honeycomb core disposed between a first skin and a second skin. The first and second skins are coupled to opposing faces of the honeycomb core; and a tent canopy coupled to the perimeter edge of the platform. The first skin comprises a plurality of layers, wherein at least one layer comprises an aluminum sheet. The bottom skin and the top skin may include a sheet made from plastic, aluminum, fiberglass, polypropylene, or another material. One or more of the skins may have a thickness sufficient to receive and retain a fastener, such as a bolt or rivet, to support sides, poles, hinges, edges, racks, rails, or other components of the container system. A first layer of skin may be polypropylene, and a second layer of the skin may be an aluminum sheet bonded or otherwise attached (e.g., via adhesive, etc.) to the first layer of skin. A base member may include mounting hardware, such as transversely mounted rails configured to rest perpendicularly across a standard vehicle roof rack although the rails or other mounting hardware may have other configurations.

However, the conventional vehicle-mounted rooftop tents still have many undesirable features such as weight, bulkiness, slow and/or complicated set-up, lack of aesthetic or convenient features, and many loose parts to be stored. The users often feel exhausted after pitching. Further, the conventional tents are heavy and thus inconvenient to carry with. Further, the tents would fall when subject to strong winds and/or heavy rains if the tents are not reliably pitched.

In light of the above-mentioned problems, there is a rooftop tent assembly for vehicles, configured to be easily affixed on the top of a vehicle and be easily deployed by unfolding and expanding when a ladder is pulled. Further, there is also a need for a rooftop tent assembly that could a lightweight, portable, aerodynamic platform, which is converted to a sheltered living space for the users.

SUMMARY OF THE INVENTION

The present invention generally discloses a rooftop tent assembly for vehicles. In one embodiment, the tent assembly is configured to be easily affixed on the top of a vehicle and be easily deployed by unfolding and expanding when a ladder is pulled by a user. In one embodiment, the tent assembly could sufficiently provide space for two or more persons to lie down within the tent. In one embodiment, the tent assembly comprises cover, a base, an extension plate, and a ladder.

In one embodiment, the base is securely affixed to a roof rack of the vehicle using one or more fasteners. In one embodiment, the base is made of a material, but not limited to, an aluminum honeycomb material. In one embodiment, the extension plate is securely and hingedly connected to one end of the base so as to overlap with the base. In one embodiment, the base and the extension plate are provided with a mattress. When the tent assembly is deployed by the user, the mattress could be aligned each other, thereby enabling the user to lie down within the tent assembly. In one embodiment, the base is made of, but not limited to, an aluminum honeycomb material.

In one embodiment, the cover is securely and hingedly affixed to another end of the base. The cover is configured to conceal the tent assembly. In one embodiment, the cover comprises a smooth and aerodynamic contour for reducing drag, wind noise, and undesired lift forces at vehicle's high speeds. In one embodiment, the cover is made of at least any one material includes, but not limited to, aluminum, titanium or Ti-6Al-4V, and carbon fiber. In one embodiment, the cover comprises a tread plate or a checker plate and a shell frame, wherein the tread plate is securely welded to a top portion of the shell frame to form the cover.

In one embodiment, the ladder is securely affixed to a top portion of the extension plate using one or more fasteners. The ladder is configured to enable a user to deploy the tent assembly by pulling it down and adjusting until the extension plate is aligned to the base after opened the cover, thereby positioning a tent portion (not shown) over the base and the extension plate for providing a sheltered living space for one or more persons. In one embodiment, the ladder is further configured to support the extension plate with respective to the surface. In one embodiment, the ladder could be, but not limited to, a telescopic extendable and collapsible ladder. In one embodiment, the tent assembly further comprises an internal seal system for efficiently preventing water, dust, and other particulate matter from entering into the tent assembly. In one embodiment, the tent assembly further comprises a rail track so further roof accessories could be added such as roof racks or solar panels, 4×4 mud tracks, and more. In one embodiment, the tent assembly further comprises cut out logos which has a backing plate silicone sealed behind with unique paint colors. This provides maximum durability and permanent logo placement.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
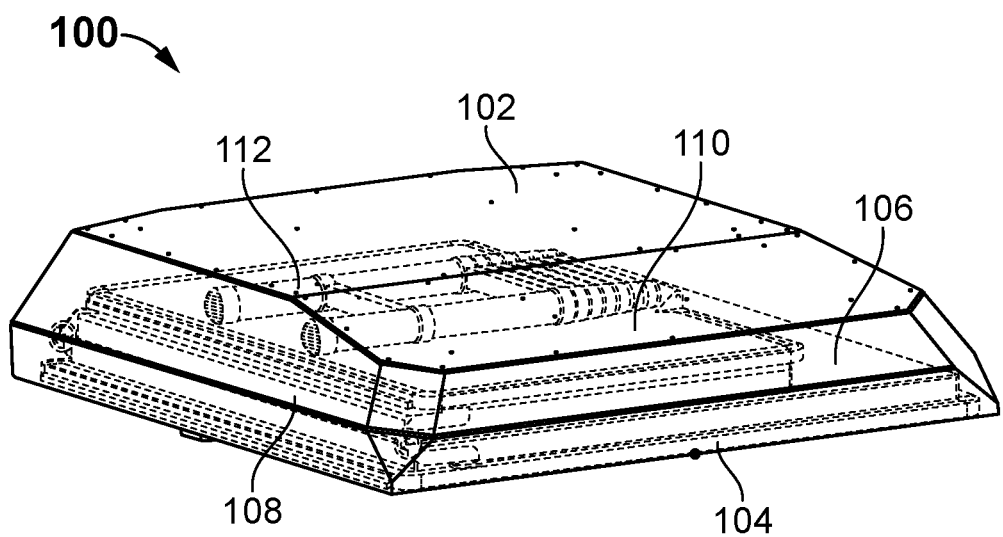
FIGS. 1-2 illustrate a perspective view of a rooftop tent assembly for vehicles, according to an embodiment of the present invention.
Figure 2:
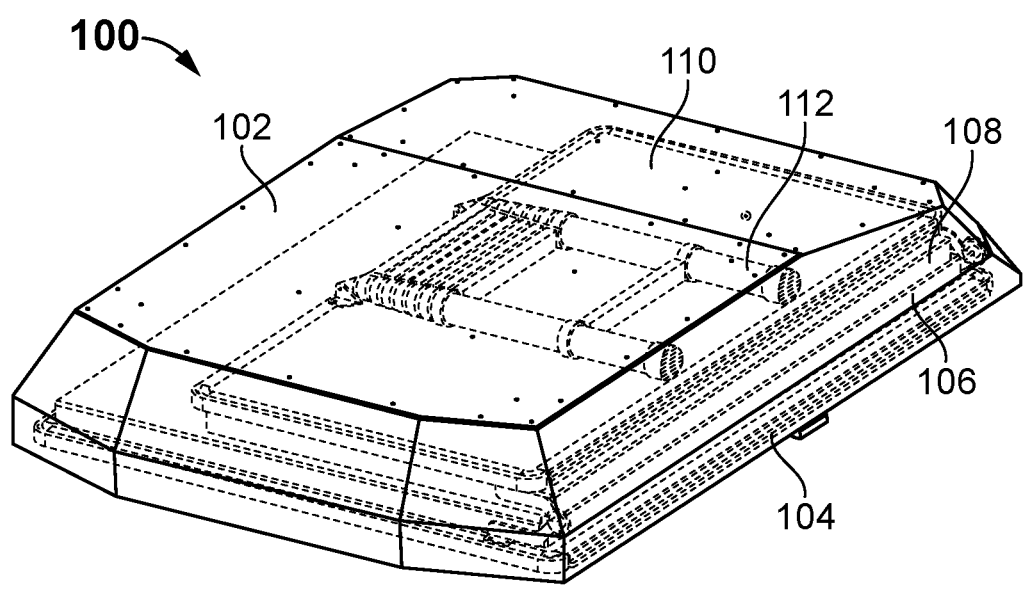
Figure 3:
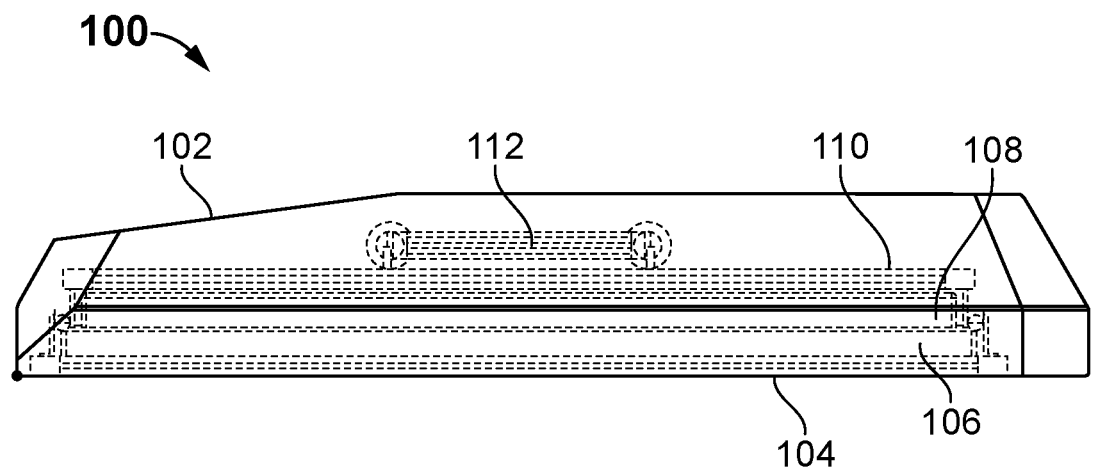
FIG. 3 illustrates a side view of a rooftop tent assembly in one embodiment of the present invention.

Referring to FIGS. 1-3, a rooftop tent assembly 100 for vehicles in an embodiment is disclosed. In one embodiment, the tent assembly 100 is configured to be easily affixed on the top of a vehicle and be easily deployed by unfolding and expanding when a ladder is pulled by a user. In one embodiment, the tent assembly 100 could sufficiently provide space for two or more persons to lie down within the tent. In one embodiment, the tent assembly 100 comprises cover 102, a base 104, an extension plate 110, and a ladder 112.

In one embodiment, the base 104 is securely affixed to a roof rack of the vehicle using one or more fasteners. In one embodiment, the base 104 is made of a material, but not limited to, an aluminum honeycomb material. In one embodiment, the extension plate 110 is securely and hingedly connected to one end of the base 104 so as to overlap with the base 104. In one embodiment, the base 104 and the extension plate 110 are provided with a mattress. When the tent assembly 100 is deployed by the user, the mattress (106 and 108) could be aligned each other, thereby enabling the user to lie down within the tent assembly 100. In one embodiment, the base 104 is made of, but not limited to, an aluminum honeycomb material.

In one embodiment, the cover 102 is securely and hingedly affixed to another end of the base 104. The cover 102 is configured to conceal the tent assembly 100. In one embodiment, the cover 102 comprises a smooth and aerodynamic contour for reducing drag, wind noise, and undesired lift forces at vehicle's high speeds. In one embodiment, the cover 102 is made of at least any one material includes, but not limited to, aluminum, titanium or Ti-6Al-4V, and carbon fiber. In one embodiment, the cover 102 comprises a tread plate or a checker plate 120 (shown in FIG. 8) and a shell frame 126 (shown in FIG. 8), wherein the tread plate 120 is securely welded to a top portion of the shell frame 126 to form the cover 102.

In one embodiment, the ladder 112 is securely affixed to a top portion of the extension plate 110 using one or more fasteners. The ladder 112 is configured to enable a user to deploy the tent assembly 100 by pulling it down and adjusting until the extension plate 110 is aligned to the base 104 after opened the cover 102, thereby positioning a tent portion 168 (shown in FIG. 27) over the base 104 and the extension plate 110 for providing a sheltered living space for one or more persons. In one embodiment, the ladder 112 is further configured to support the extension plate 110 with respective to the surface. In one embodiment, the ladder 112 could be, but not limited to, a telescopic extendable and collapsible ladder. In one embodiment, the tent assembly 100 further comprises an internal seal system for efficiently preventing water, dust, and other particulate matter from entering into the tent assembly 100. In one embodiment, the tent assembly 100 further comprises a rail track so further roof accessories could be added such as roof racks or solar panels, 4×4 mud tracks, and more. In one embodiment, the tent assembly 100 further comprises cut out logos which has a backing plate silicone sealed behind with unique paint colors. This provides maximum durability and permanent logo placement.

Figure 4:
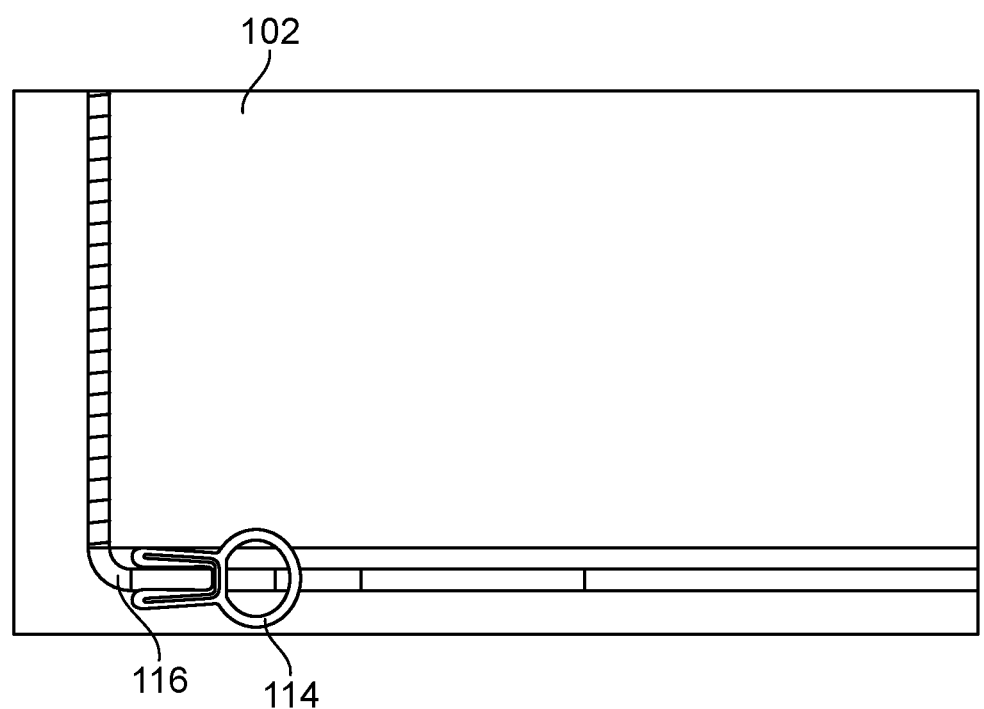
FIG. 4 illustrates a side view of an internal seal system having a gasket affixed to an internal flange of the cover of the rooftop tent assembly in one embodiment of the present invention.
Figure 5:
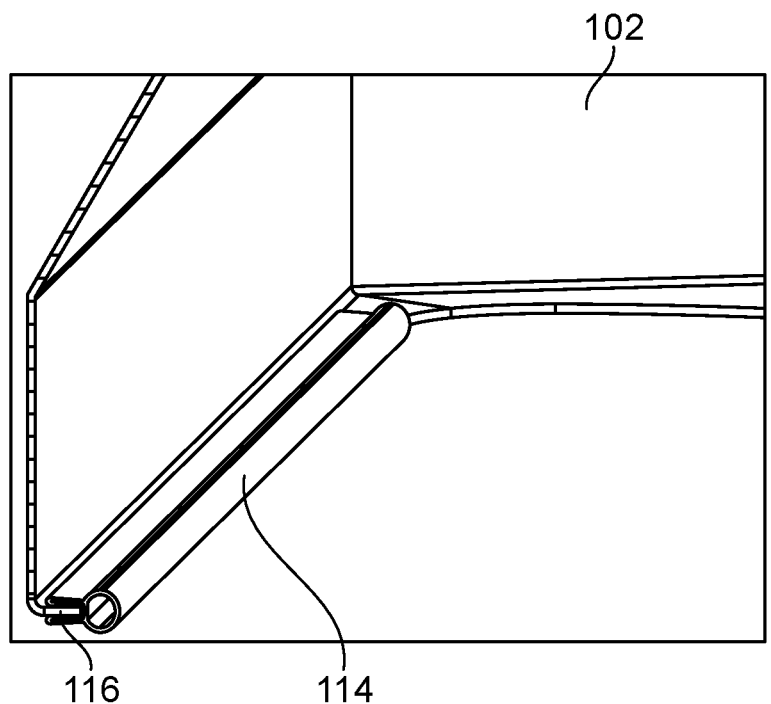
FIG. 5 illustrates a perspective view of the internal seal system of the rooftop tent assembly in one embodiment of the present invention.

Referring to FIGS. 4-5, an internal seal system having a gasket 114 affixed to an internal flange 116 of the cover 102 of the tent assembly 100 in one embodiment is disclosed. In one embodiment, the internal seal system comprises a gasket 114, which is securely affixed to an internal flange 116 on a bottom portion of the cover 102. In one embodiment, the gasket 114 is configured to provide watertight and dust proof, thereby efficiently preventing water, dust, and other particulate matter from entering into the rooftop tent assembly 100. In one embodiment, the gasket could be, but not limited to, a rubber dust seal. There is a clearance of 6-8 mm between the internal flange 116 and internal tent assembly. The gasket or rubber seal 114 is about 12 mm therefore when engaged with the internal assembly there is 4-6 mm of pressure applied to the gasket 114 ensuring the tent assembly 100 is watertight and dust proof.

Figure 6:
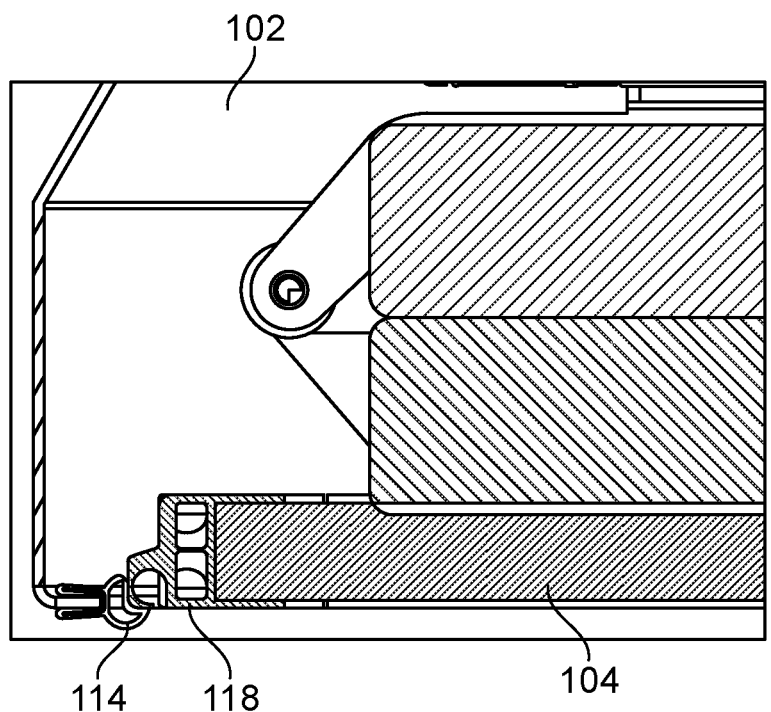
FIG. 6 illustrates a side view of a dust seal or gasket engages with an internal tent assembly seal in one embodiment of the present invention.

Referring to FIG. 6, a side view of a dust seal or gasket 114 engages with an internal tent assembly seal 118 is disclosed, according to one embodiment of the present invention. In one embodiment, the dust seal 114 is engaged to the internal tent assembly seal 118 at the base 104. In one embodiment, the dust seal 114 has a dimension of about 12 mm. In one embodiment, the internal tent assembly seal 118 has a flange proximal to the dust seal 114. In one embodiment, a clearance of about 6-8 mm is provided between the flange and the internal tent assembly 118, thereby engaging the dust seal 114 at certain pressure. In one embodiment, the dust seal 114 could be engaged with about 4-6 mm of pressure.

Figure 7:
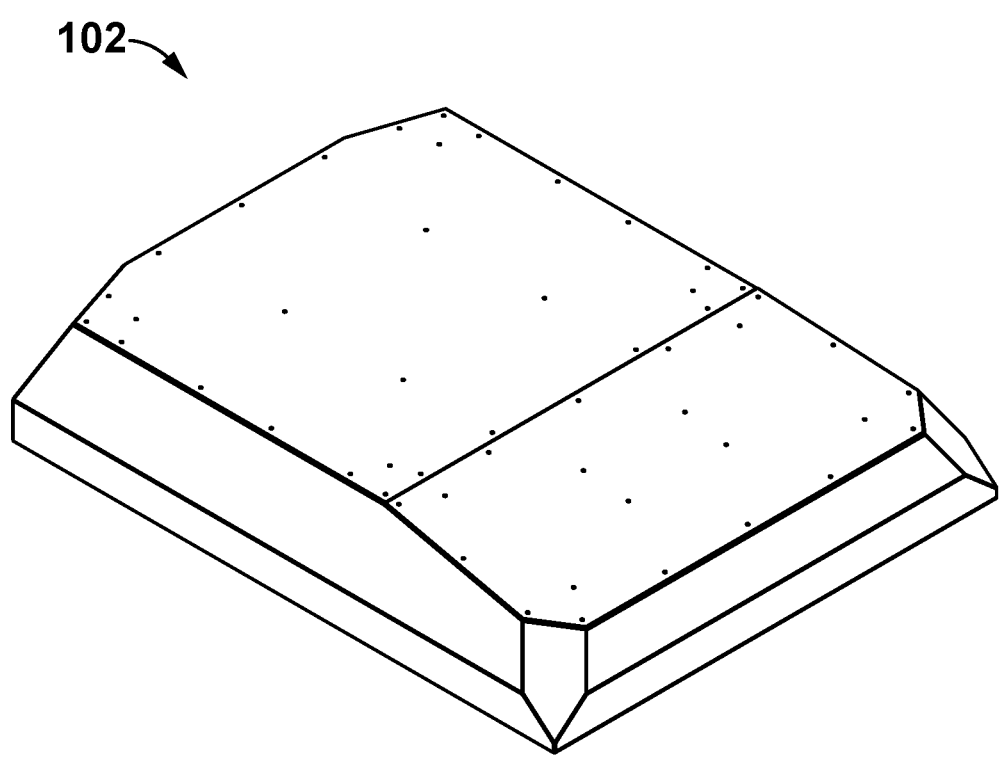
FIG. 7 illustrates a top perspective view of the cover of the rooftop tent assembly in one embodiment of the present invention.
Figure 8:
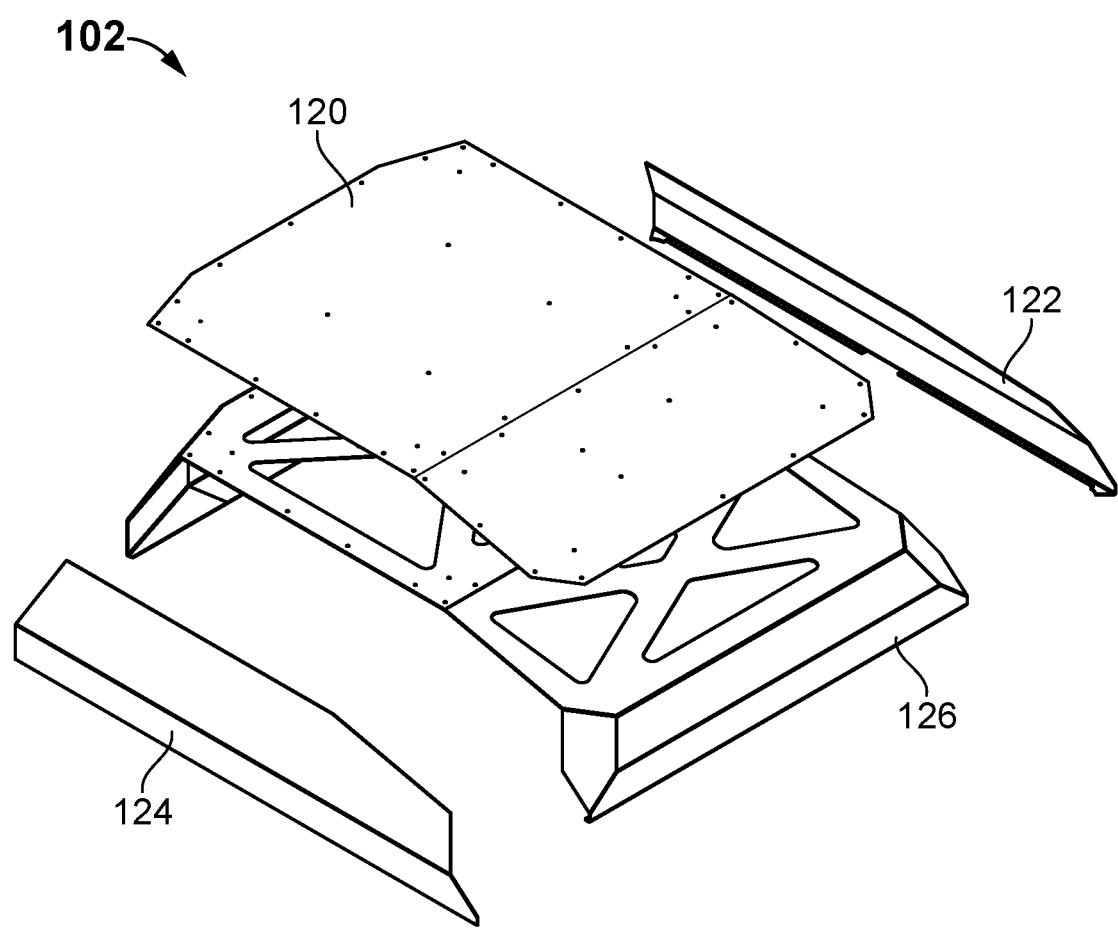
FIG. 8 illustrates an exploded view of the cover of the rooftop tent assembly in one embodiment of the present invention.
Figure 9:
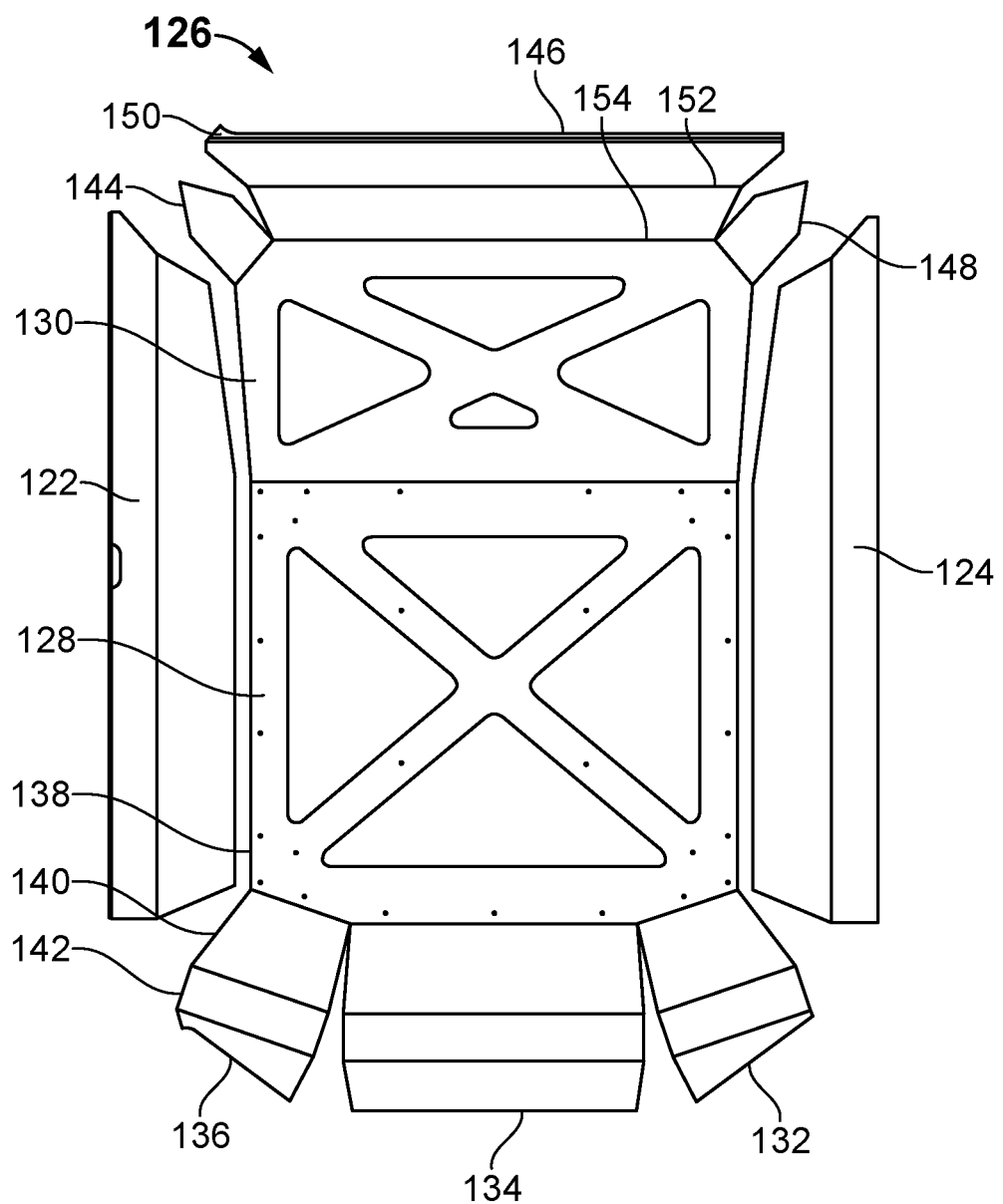
FIG. 9 illustrates a top view of a shell frame with one or more side wings in one embodiment of the present invention.
Figure 10:
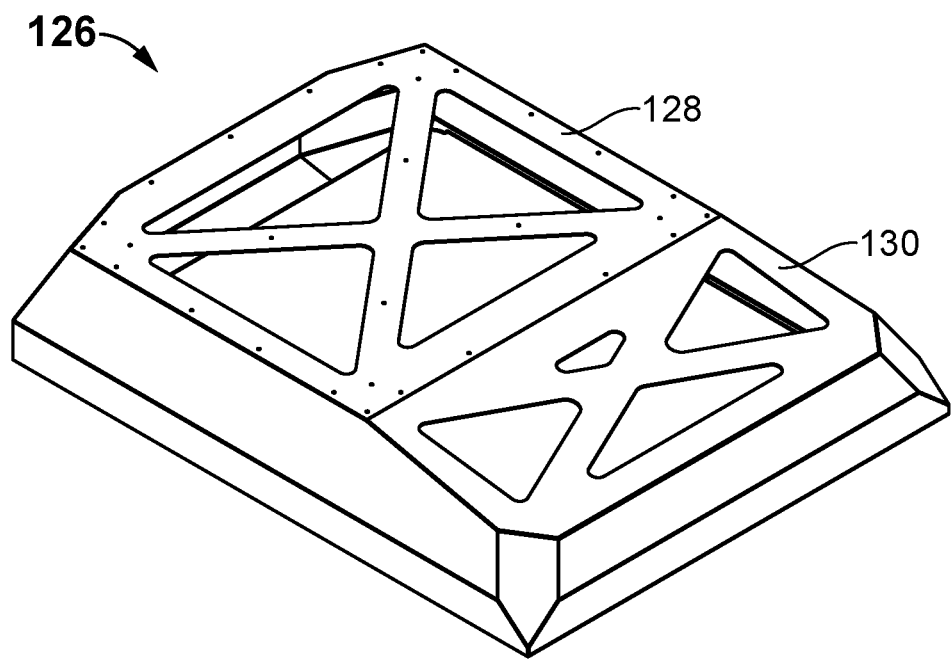
FIG. 10 illustrates a top perspective view of the shell frame of the cover of the rooftop tent assembly in one embodiment of the present invention.
Figure 11:
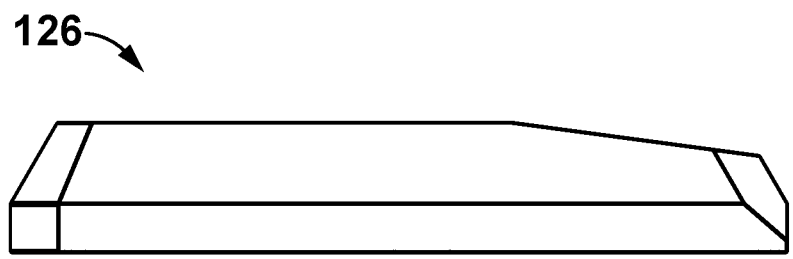
FIG. 11 illustrates a side view of the shell frame of the cover of the rooftop tent assembly in one embodiment of the present invention.
Figure 12:
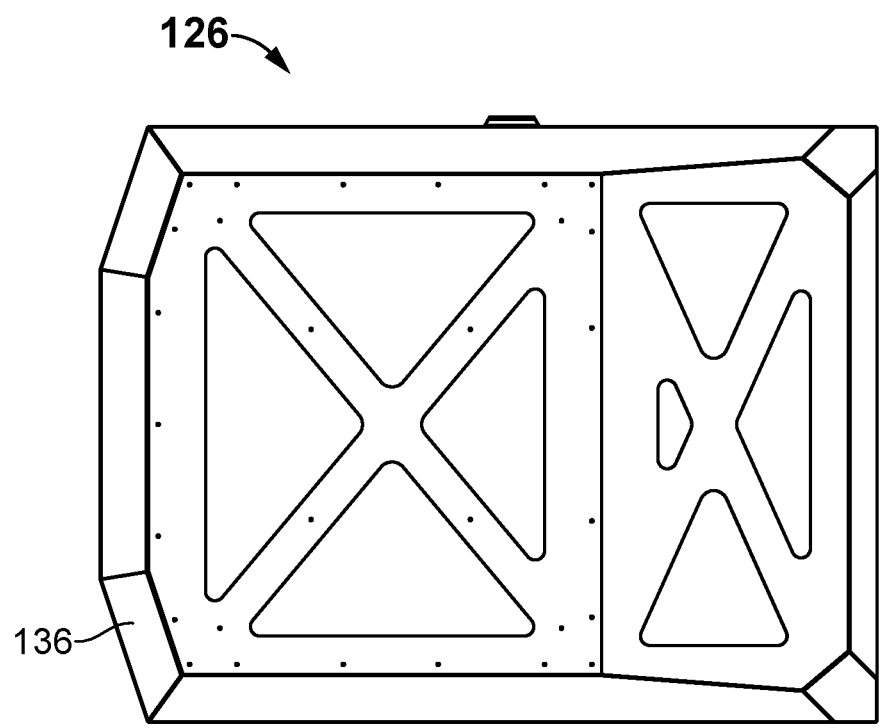
FIG. 12 illustrates a top view of the shell frame of the cover of the rooftop tent assembly in another embodiment of the present invention.
Figure 13:
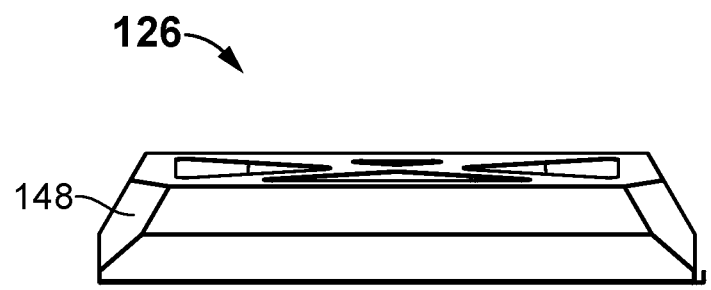
FIG. 13 illustrates a front view of the shell frame of the cover of the rooftop tent assembly in another embodiment of the present invention.

Referring to FIGS. 7-8, the cover 102 of the rooftop tent assembly 100 in one embodiment is disclosed. In one embodiment, the cover 102 comprises a tread plate or a checker plate 120 and a shell frame 126. In one embodiment, the tread plate 120 is securely welded to a top portion of the shell frame 126 to form the cover 102. In some embodiments, the tread plate 120 could be riveted and silicon glued onto the top of the shell frame 126 for providing weather tightness and extra durability. In one embodiment, the tread plate 120 could be made of, but not limited to, 2 mm alloy and the shell frame 126 could be made of, but not limited to, aluminum 5052 3 mm or 2 mm sheet. In one embodiment, the cover 102 comprises at least two side wings (122 and 124) affixed to the sides of the shell frame 126.

Referring to FIGS. 9-13, different views of a shell frame 126 of the cover 102 is disclosed, according to one embodiment of the present invention. In one embodiment, the shell frame 126 has a first portion 128 and a second portion 130. In one embodiment, the first portion 128 and the second portion are affixed together. In one embodiment, the first portion 128 has a flat surface, whereas the second portion is slightly bent from the first portion. In one embodiment, the second portion 128 is bent to about UP 7.6° R2.5. In one embodiment, the distal end of the first portion 128 has at least three sections including a first section 132, a second section 134, and a third section 136. In one embodiment, each section (132, 134, and 136) has three folds including a first fold 138, a second fold 140, and a third fold 142. In one embodiment, the first fold 138 is made at the proximal end having the dimension of about UP 60.0° R2.5. In one embodiment, the second fold 140 has a dimension of about UP 30.0° R10. In one embodiment, the third fold 142 is made at the distal end having a dimension of about UP 90.0° R2.5. In one embodiment, the first section 132 and the third section 136 are provided at the corners of the first portion 128. In one embodiment, the first section 132 and the third section 136 has a folding angle of about 18.4°.

In one embodiment, the distal end of the second portion 130 has at least three sections including a first section 144, a second section 146, and a third section 148. In one embodiment, the first section 144 has a dimension of about UP 45.6° R2.5. In one embodiment, the second section 146 has at least three folds including a first fold 150, a second fold 152, and a third fold 154. In one embodiment, the first fold 150 has a dimension of about UP 52.4° R2.5. In one embodiment, the second fold 152 has a dimension of about UP 30.0° R2.5. In one embodiment, the third fold 154 has a dimension of about UP 90.0° R2.5. In one embodiment, the third section 148 has a dimension of about UP 45.6° R2.5. In one embodiment, the first section 144 and the third section 148 are provided at the corners of the second portion 130. In one embodiment, the first section 144 and the third section 148 has a folding angle of about 30.0°.

In one embodiment, the shell frame 126 comprises at least two side wings (122 and 124). In one embodiment, the side wings (122 and 124) are affixed to the sides of the shell frame 126 configured to provide the side walls to the cover 102. In an exemplary embodiment, the shell frame 126 is a solid aluminum body made of aluminum 5052. The aluminum 5052 has a dimension of about 3 mm or 2 mm. In one embodiment, the aluminum 5052 grade could be easily bent without fracturing and also provides the most structural integrity. The solid aluminum body is then treated with acid treat. Further, a hard-wearing powder coat is applied on both the alloy checker plate 120 (shown in FIG. 14) and shell frame 126.

Figure 14:
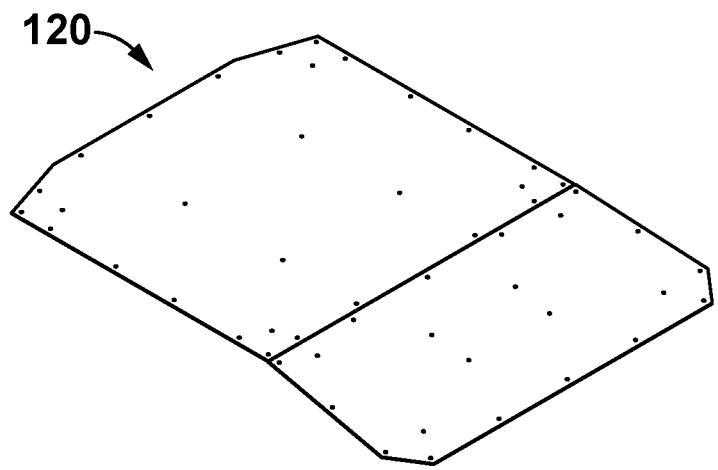
FIG. 14 illustrates a top perspective view of a tread plate of the cover of the rooftop tent assembly in one embodiment of the present invention.
Figure 15:
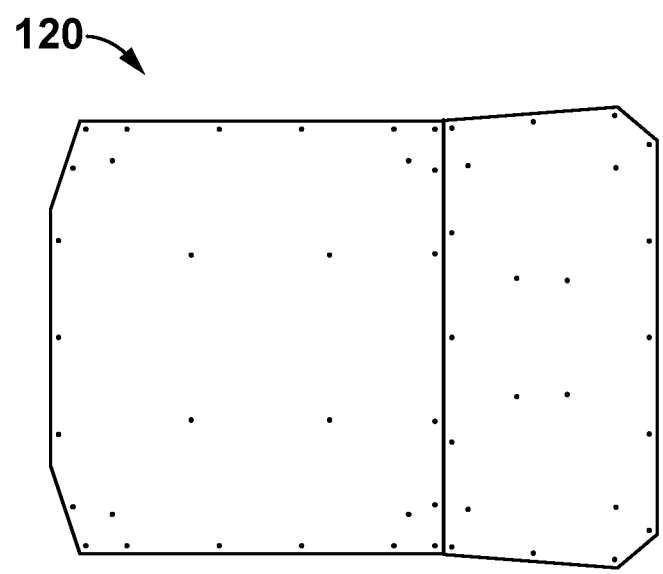
FIG. 15 illustrates a top view of the tread plate of the cover of the rooftop tent assembly in one embodiment of the present invention.
Figure 16:
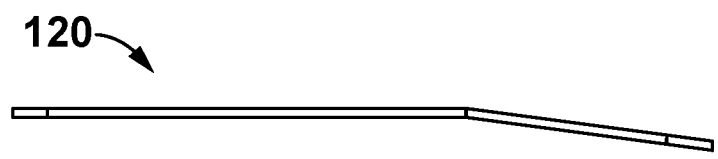
FIG. 16 illustrates a side view of the tread plate of the cover of the rooftop tent assembly in one embodiment of the present invention.

Referring to FIGS. 14-16, a perspective view, a top view, and a side view of the tread plate 120 in one embodiment is disclosed. In one embodiment, the tread plate 120 is added to the shell exoskeleton portion made from 2 mm alloy. This grade of aluminum is easily bent without fracturing and provides the most structural integrity.

In one embodiment, the tread plate 120 is designed to have a top flat section and a top inclined section. In one embodiment, the top inclined section is 7.6 degrees dropped down from the flat section (as shown in FIG. 16) and provides strong structural integrity. In one embodiment, the tread plate 120 is riveted, and silicon glued or welded on to the top of the shell exoskeleton portion to provide weather tightness and extra durability. In one embodiment, the top flat section is a laser cutting with precut rivet holes. The aluminum checker plate and solid aluminum body i.e., the main body is coated with hard-wearing power after treatment with acid. In one embodiment, the tent assembly 100 could be manufactured with the dimensions such as, but not limited to, 1.5 m length right hand opening (RHO) and 1.5 m length left hand opening (LHO) and 1.9 m LHO and 1.9 m RHO. In one embodiment, a laser cut/waterjet cut, or CNC cut could be used to provide structural body of the tent assembly 100 for reducing production cost, increasing production efficiency, providing super high tolerance (nearly 0.1 mm) and accuracy every time. The structural cuts could provide maximum structural stability whilst reducing weight.

Figure 17:
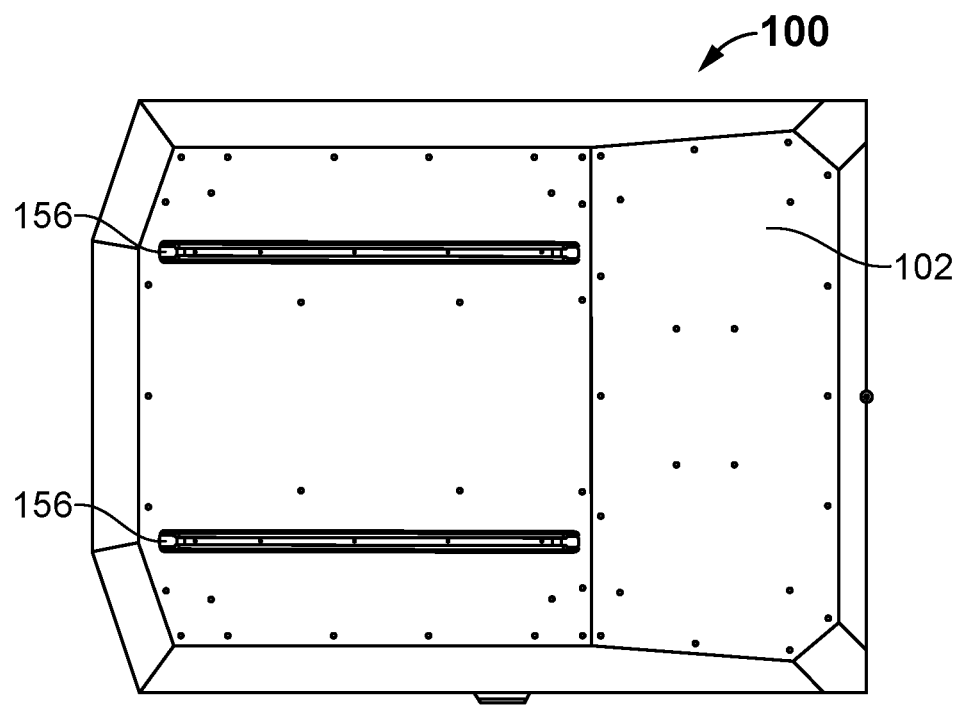
FIG. 17 illustrates a top view of the tent assembly in a closed position having a rack and rail mounting system in one embodiment of the present invention.
Figure 18:
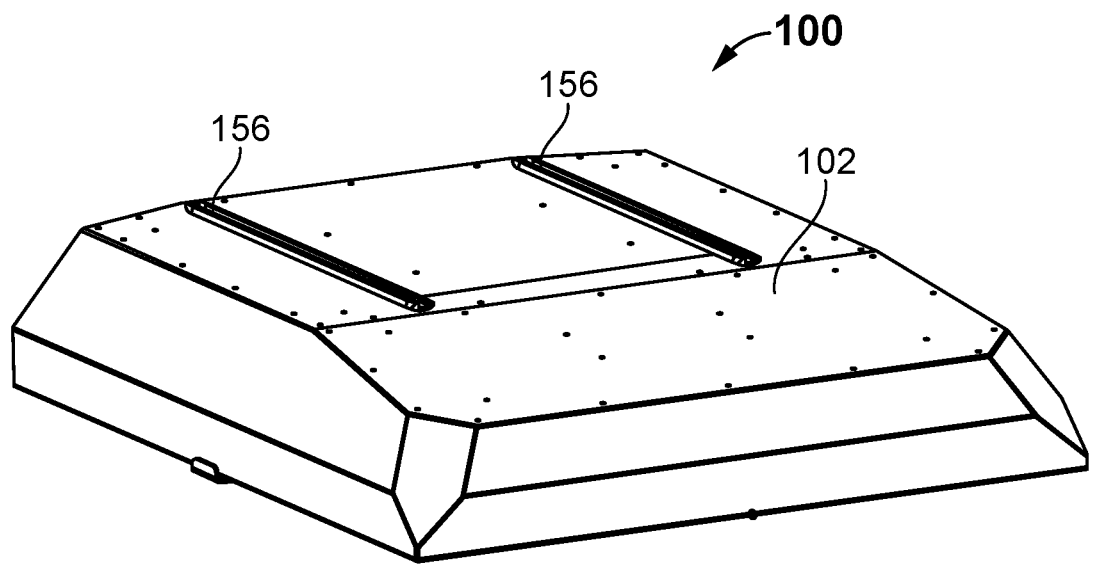
FIG. 18 illustrates a top perspective view of the tent assembly in the closed position with the rack and rail mounting system in one embodiment of the present invention.
Figure 19:
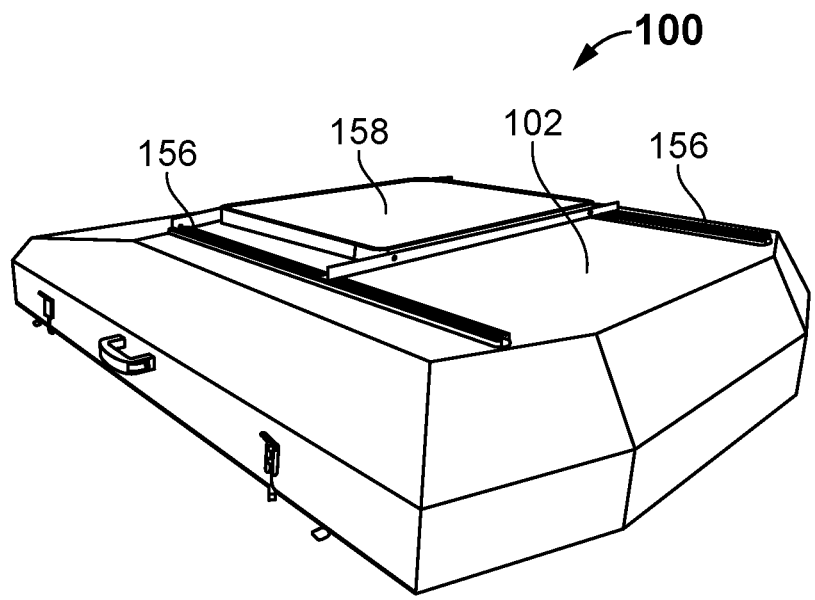
FIG. 19 illustrates a top perspective view of the tent assembly in the closed position mounted with a solar panel in one embodiment of the present invention.

Referring to FIGS. 17-19, a rack and rail mount system 156 of the tent assembly 100 is disclosed, according to one embodiment of the present invention. In one embodiment, the rack and rail mount system 156 comprises a pair of rails, which are securely affixed to the top portion of the cover 102 of the tent assembly 100. The pair of rails of the rack and rail mount system 156 is placed parallel to each other on the top portion of the cover 102. In one embodiment, the rack and rail mount system 156 allows the storage of roof accessories. In one embodiment, the rack and rail mount system 156 is added with additional roof racks for storing accessories such as, but not limited to, solar panels, bikes, kayaks, spare tires, surfboards, etc. In one embodiment, a solar panel 158 is mounted on the top portion of the rack and rail mount system 156.

Figure 20:
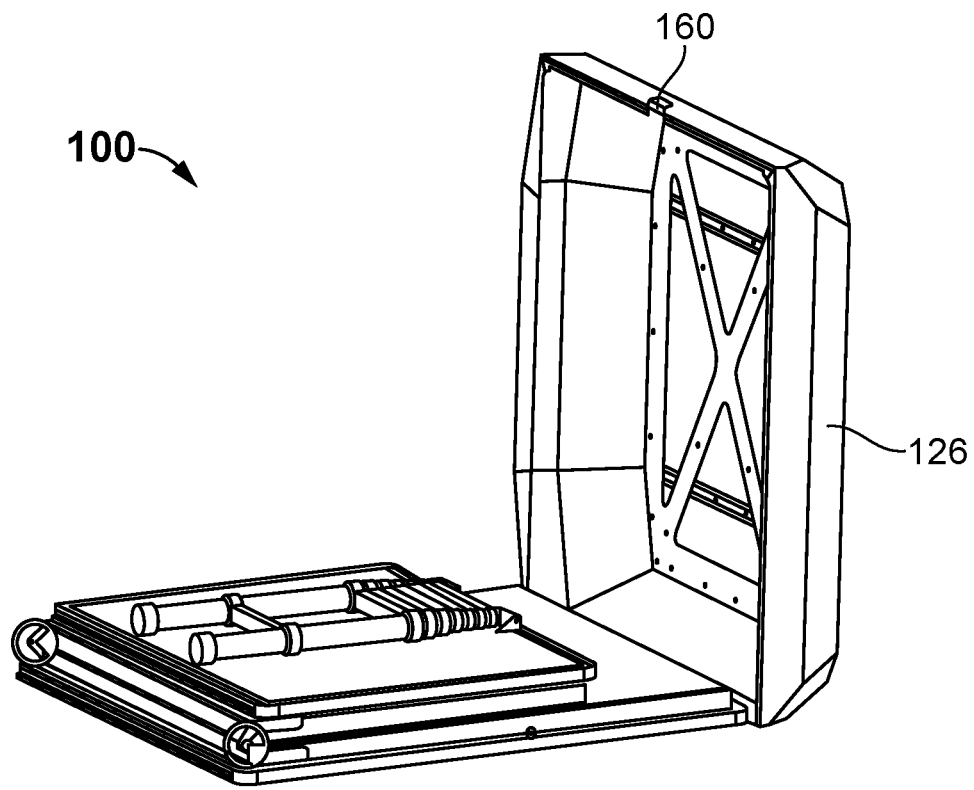
FIG. 20 illustrates a perspective view of the tent assembly in an open position in one embodiment of the present invention.
Figure 21:
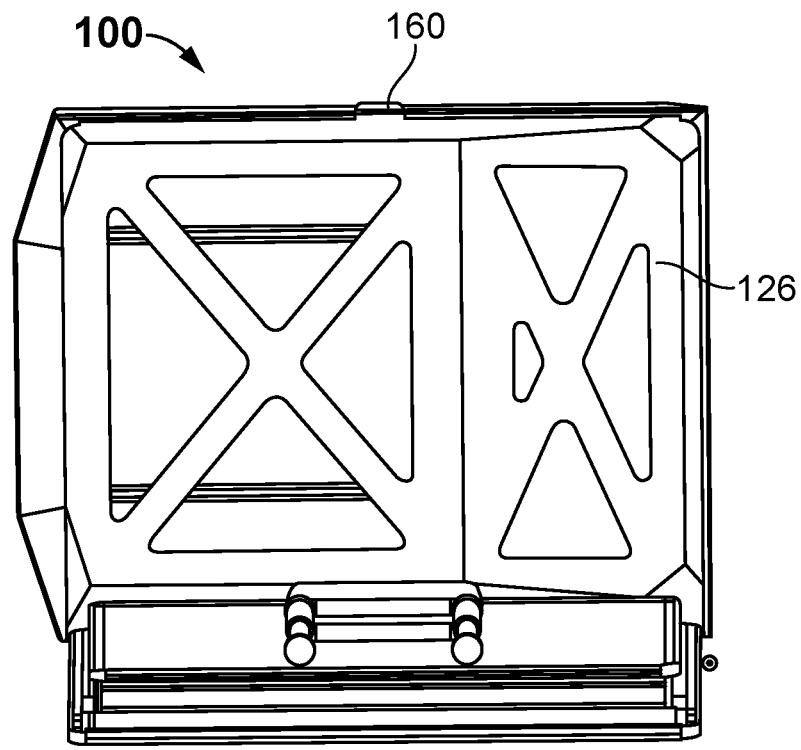
FIG. 21 illustrates a top view of the tent assembly in an open position in one embodiment of the present invention.
Figure 22:
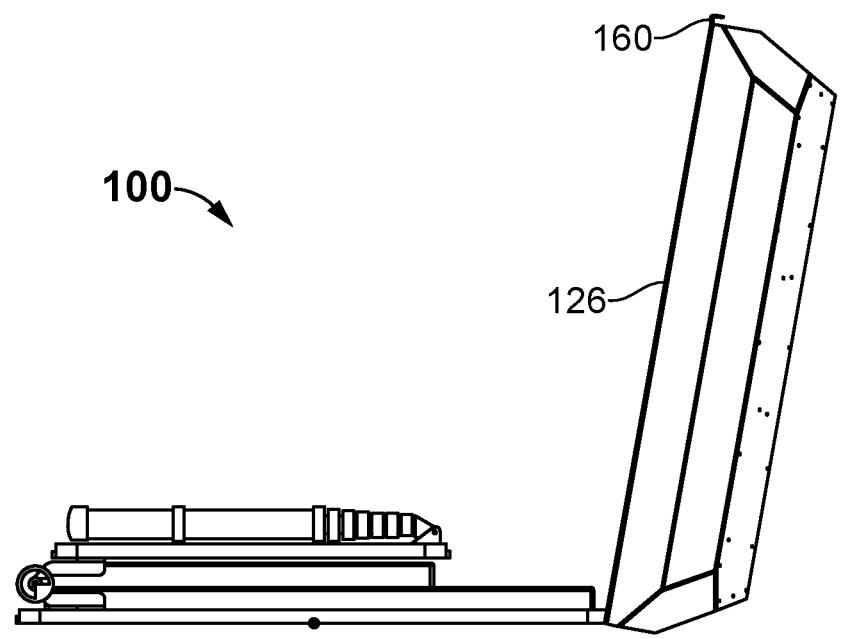
FIG. 22 illustrates a front view of the tent assembly in an open position in one embodiment of the present invention.
Figure 23:
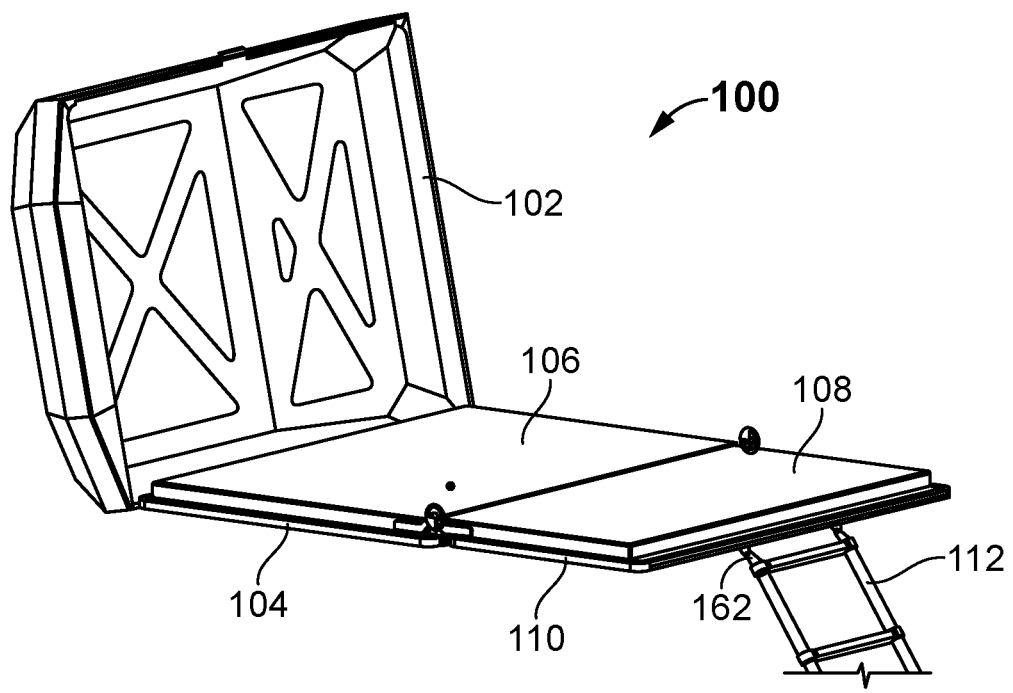
FIG. 23 illustrates a side perspective view of the tent assembly in an extended position in one embodiment of the present invention.
Figure 24:
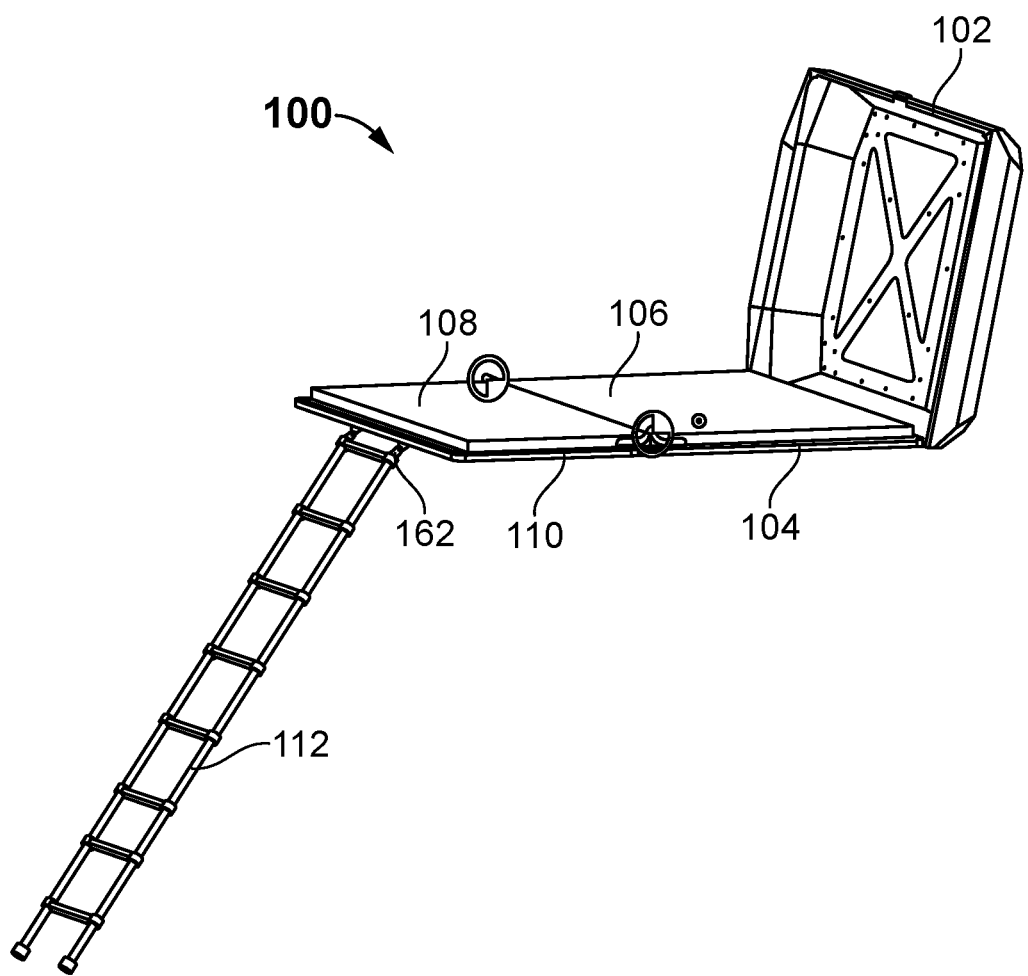
FIG. 24 illustrates a side perspective view of the tent assembly with an extended ladder assembly in one embodiment of the present invention.
Figure 25:
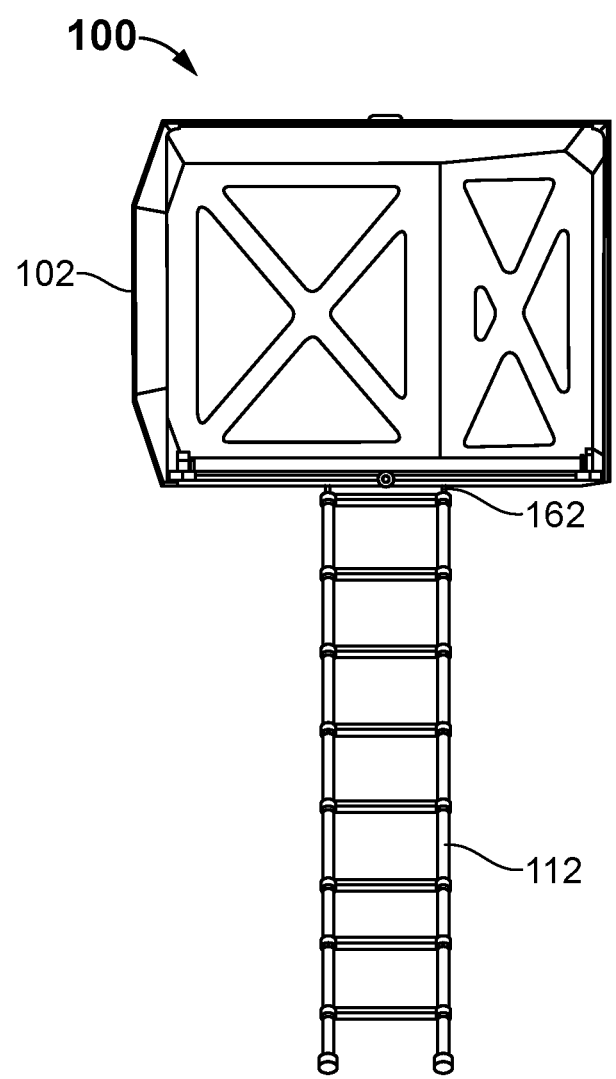
FIG. 25 illustrates a top view of the tent assembly with the extended ladder assembly in one embodiment of the present invention.
Figure 26:
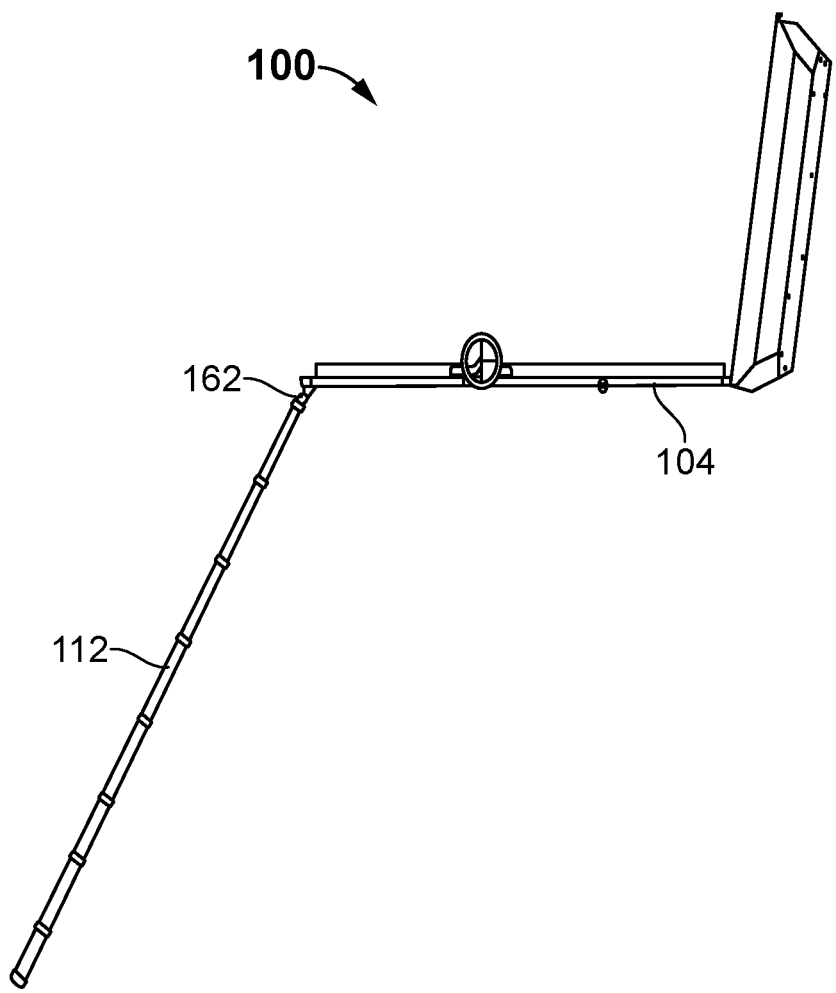
FIG. 26 illustrates a side view of the tent assembly with the extended ladder assembly in one embodiment of the present invention.

Referring to FIGS. 20-22, different views of the tent assembly 100 in an open position are disclosed, according to one embodiment of the present invention. In one embodiment, the tent assembly 100 is a side opening hard shell roof top tent assembly. The tent assembly 100 comprises a side opening 160. In one embodiment, the tent assembly 100 comprises the side opening 160 at the left-hand ×3 side called left hand opening (LHO). In one embodiment, the left hand opening (LHO) has a dimension of about 1.5 m. In another embodiment, the left hand opening (LHO) has a dimension of about 1.9 m. In one embodiment, the tent assembly 100 comprises the side opening 160 at the right-hand ×4 side called right hand opening (RHO). In one embodiment, the internal assembly of the tent assembly 100 is folded up with the shell open from the right hand side. In one embodiment, the right hand opening (RHO) has a dimension of about 1.5 m. In another embodiment, the right hand opening (RHO) has a dimension of about 1.9 m.

Referring to FIGS. 23-26, different views of the tent assembly 100 in an extended position are disclosed, according to one embodiment of the present invention. In one embodiment, the tent assembly 100 comprises an internal base assembly or base 104 and a ladder assembly or ladder 112. In one embodiment, the ladder 112 could be a telescopic ladder. In one embodiment, the ladder 112 comprises one or more internal tubes, which are configured to provide telescopic extension, thereby enabling the ladder 112 to extend to a desired length. In one embodiment, the ladder 112 is connected to a distal end of the extension plate 106 using one or more fasteners and a hinge connector 162. The user could deploy the tent assembly by opening the cover or shell 102 and pulling down and adjusting the ladder 112 until the extension plate 110 is aligned to the base 104. In one embodiment, the base 104, extension plate 110, and the mattress (106 and 108) are folded out while deploying the tent assembly 100. In one embodiment, the mattress (106 and 108) could be, but not limited to, a waterproof foam mattress and a hybrid laminated mattress.

Figure 27:
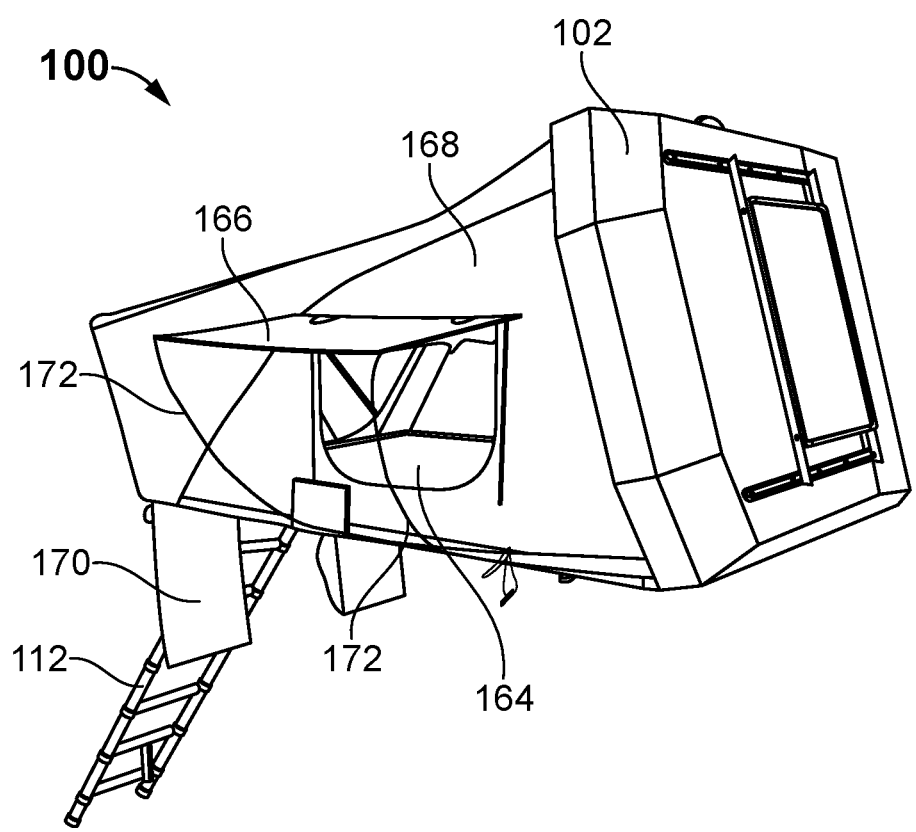
FIG. 27 illustrates a perspective view of the tent assembly in a fully extended position in one embodiment of the present invention.

Referring to FIG. 27, a perspective view of the tent assembly 100 in a fully extended position is disclosed, according to one embodiment of the present invention. In one embodiment, the tent assembly 100 provides sheltered living space for one or more persons. In one embodiment, the tent assembly 100 comprises a base 104 affixed to a roof portion of the vehicle. In one embodiment, the base 104 is affixed with an extension plate 110 at one end and a cover 102 on another end. In one embodiment, the extended plate 110 is affixed with a collapsible ladder 112 to enable users to deploy the tent assembly 100. In one embodiment, the extension plate 110 is aligned to the base 104 after opening the cover 102. In one embodiment, the cover 120 of the tent assembly 100 is mounted with a solar panel 158. When the user opens the cover 102 then the tent portion 168 could be extended over the base 104 and the extension plate 110 for providing a sheltered living space for one or more persons. The tent portion 168 is secured to the cover 102, base 104, and the expansion plate 110 in order to serve as side walls and a ceiling of the inner space so as to protect the internal space from weather and foreign matter or external impact. In one embodiment, the tent portion 168 could be supported on a frame member and poles. The tent portion 168 is streamline and robust and allows the user to accessorize and equip. In one embodiment, the tent portion 168 is made of, but not limited to, Poly-Cotton canvas seam sealed waterproof. In one embodiment, the user could quickly and safely fold the tent portion 168 by removing the poles and folding into a small volume when the tent assembly 100 is disassembled.

In one embodiment, the tent portion 168 further comprises one or more windows 164 on both sides to allow light inside the inner space and improve ventilation. The windows 164 are more easily accessible to enable the user to view the external environment. In one embodiment, the windows 164 could be closed and zippered onto covers 166 so as to prevent water, dust, and other foreign matter from entering the inner space of the tent assembly 100. In one embodiment, the cover 166 could be supported using one or more poles 172, wherein the poles 172 are connected to the base 104.

In one embodiment, the tent portion 168 further comprises one or more pockets 170 with a Velcro® sealable cover at the entrance of the tent assembly 100. In one embodiment, the pockets 170 could enable the user to safely keep shoes and other accessories.

Preferred embodiments of this invention are described herein, including the best mode known to the inventors for carrying out the invention. It should be understood that the illustrated embodiments are exemplary only and should not be taken as limiting the scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A rooftop tent assembly for vehicles, comprising:
a base securely affixed to a roof portion of the vehicle using one or more first fasteners;
an extension plate securely and hingedly connected to one end of the base so as to overlap with the base;
a cover hingedly affixed to another end of the base, wherein the cover comprises a tread plate or a checker plate and a shell frame, wherein the tread plate is securely welded to a top portion of the shell frame to form the cover,
wherein the cover comprises a smooth and aerodynamic contour for reducing drag, wind noise, and undesired lift forces at the vehicle's high speeds;
a ladder securely affixed to a top portion of the extension plate using one or more second fasteners, wherein the ladder is configured to enable a user to deploy the rooftop tent assembly by pulling down and adjusting until the extension plate is aligned to the base after opening the cover, thereby positioning a tent portion over the base and extension plate for providing a sheltered living space for one or more persons, and
an internal seal system having a gasket, wherein the gasket is securely affixed to an internal flange on a bottom portion of the cover.

2. The rooftop tent assembly of claim 1, wherein the base and the extension plate are provided with a mattress.

3. The rooftop tent assembly of claim 1, wherein the ladder is further configured to support the extension plate with respect to a surface.

4. The rooftop tent assembly of claim 1, wherein the ladder is a telescopic extendable and collapsible ladder.

5. The rooftop tent assembly of claim 1, wherein the gasket is a rubber dust seal.

6. The rooftop tent assembly of claim 1, wherein the cover is made of at least one material including aluminum, titanium or Ti-6Al-4V, and carbon fiber.

7. The rooftop tent assembly of claim 1, is further configured to simply and securely affix to a roof rack of the vehicle using the one or more first fasteners.

8. The rooftop tent assembly of claim 1, wherein the base is made of an aluminum honeycomb material.

9. The rooftop tent assembly of claim 1, further comprises a rack and rail mount system, wherein the rack and rail mount system having a pair of rails, which are securely affixed to a top portion of the cover.

10. The rooftop tent assembly of claim 9, wherein the rack and rail mount system is configured to securely hold solar panels, bikes, kayaks, spare tires, and surfboards.

11. A rooftop tent assembly for vehicles, comprising:
a base securely affixed to a roof portion of the vehicle using one or more first fasteners, wherein the base is an aluminum honeycomb tent base;
an extension plate hingedly connected to one end of the base so as to overlap with the base;
a cover hingedly affixed to another end of the base, wherein the cover comprises a tread plate or a checker plate and a shell frame, wherein the tread plate is securely welded to a top portion of the shell frame to form the cover,
wherein the cover includes a smooth and aerodynamic contour for reducing drag, wind noise, and undesired lift forces at the vehicle's high speeds;
an extendable and collapsible ladder securely affixed to a top portion of the extension plate using one or more second fasteners, wherein the ladder is configured to enable a user to deploy the rooftop tent assembly by pulling down and adjusting until the extension plate is parallel to the base after opening the cover, thereby positioning a tent portion over the base and extension plate for providing a sheltered living space for one or more persons;
a gasket securely affixed to an internal flange on a bottom portion of the cover, and
a rack and rail mount system having a pair of rails, which are securely affixed to a top portion of the cover.

12. The rooftop tent assembly of claim 11, wherein the base and the extension plate are provided with a mattress.

13. The rooftop tent assembly of claim 11, wherein the ladder is further configured to support the extension plate with respect to a surface.

14. The rooftop tent assembly of claim 11, wherein the gasket is a rubber dust seal.

15. The rooftop tent assembly of claim 11, wherein the cover is made of at least one material including aluminum, titanium or Ti-6Al-4V, and carbon fiber.

16. The rooftop tent assembly of claim 11, is further configured to simply and securely affix to a roof rack of the vehicle using the one or more first fasteners.

17. The rooftop tent assembly of claim 11, wherein the rack and rail mount system is configured to securely hold solar panels, bikes, kayaks, spare tires, and surfboards.

\* \* \* \* \*